United States Patent
Henderson et al.

(10) Patent No.: US 11,454,548 B2
(45) Date of Patent: Sep. 27, 2022

(54) SENSOR ASSEMBLY FOR A RECREATIONAL VEHICLE

(71) Applicant: Haier US Appliance Solutions, Inc., Wilmington, DE (US)

(72) Inventors: Richard Dustin Henderson, La Grange, KY (US); Cody Michael Ratchford, Louisville, KY (US); Tal Abraham Ohayon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 38 days.

(21) Appl. No.: 17/106,591

(22) Filed: Nov. 30, 2020

(65) Prior Publication Data

US 2022/0170796 A1    Jun. 2, 2022

(51) Int. Cl.
*G01K 1/14* (2021.01)
*B60H 1/00* (2006.01)
*G01K 7/02* (2021.01)

(52) U.S. Cl.
CPC ........... *G01K 1/14* (2013.01); *B60H 1/00364* (2013.01); *B60H 1/00814* (2013.01); *G01K 7/02* (2013.01)

(58) Field of Classification Search
CPC ............ B60H 1/00364; B60H 1/00264; B60H 1/00792; B60H 1/008; B60H 1/2246; G01K 1/08; G01K 1/14; G01D 11/245
See application file for complete search history.

(56) References Cited

U.S. PATENT DOCUMENTS

| | | | |
|---|---|---|---|
| 5,173,922 A | 12/1992 | Arakawa et al. | |
| 8,083,402 B2* | 12/2011 | Mau | G01J 5/048 374/208 |
| 9,106,061 B1 | 8/2015 | Shotey et al. | |
| 9,352,691 B2* | 5/2016 | Watson | G02B 7/182 |
| 9,941,183 B2 | 4/2018 | Read et al. | |
| 10,634,404 B2 | 4/2020 | Obara et al. | |
| 2008/0121034 A1* | 5/2008 | Lynam | B60S 1/0822 73/335.05 |
| 2018/0038717 A1* | 2/2018 | Vidal | B60R 11/00 |

FOREIGN PATENT DOCUMENTS

DE    202004001907 U1    4/2004

* cited by examiner

Primary Examiner — Jenna M Hopkins
(74) Attorney, Agent, or Firm — Dority & Manning, P.A.

(57) ABSTRACT

An electronic sensor assembly for a recreational vehicle may include a wired electronic sensor and a sensor cover supporting the wired electronic sensor on an interior wall. The sensor cover may include a cover sidewall, a cover faceplate, and a sensor clip arm. The cover sidewall may be in selective engagement with the interior wall. The cover faceplate may extend from the cover sidewall. The cover faceplate may have an outer surface direct outward from the interior wall and an inner surface directed inward toward the interior wall. The sensor clip arm may extend inward from the inner surface. The sensor clip arm may hold the wired electronic sensor within an interior volume defined by the cover sidewall and the cover faceplate.

20 Claims, 6 Drawing Sheets

SENSOR ASSEMBLY FOR A RECREATIONAL VEHICLE

FIELD OF THE INVENTION

The present subject matter relates generally to sensor assemblies in recreational vehicles, and more particularly, to assembles for an electronic senor of air conditioner unit in a recreational vehicle.

BACKGROUND OF THE INVENTION

Certain recreational vehicles include an air conditioning system, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

In order to help direct cooling/heating of the recreational vehicle, one or more sensors are generally provided in communication with the RVAC. For instance, one or more temperature sensors may be mounted within the interior of the recreational vehicle. Typically, such temperature sensors are mounted to an interior wall of the recreational vehicle and then covered with a separate sensor housing that is placed over the mounted sensor and screwed to the interior wall.

Various issues can arise with these existing arrangements or assemblies for sensors. For instance, it can be difficult to ensure consistent placement of the separate sensor housing relative to the mounted sensor. This, in turn, may compromise the sensitivity or calibrated accuracy of the sensor. Additionally or alternatively, it can be difficult or otherwise increase installation time to separately mount the sensor and the sensor housing, since multiple mounting components have to be properly placed and secured to the interior wall.

As a result, it would be useful to provide a sensor assembly having features to address one or more of the above issues. For instance, it may be advantageous to provide an assembly that can easily ensure consistent relative placement of a sensor and a corresponding cover or housing. Additionally or alternatively, it may be advantageous to provide an improved assembly that reduces the overall complexity or time required for installation.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an electronic sensor assembly for a recreational vehicle air conditioner is provided. The electronic sensor assembly may include a wired electronic sensor and a sensor cover supporting the wired electronic sensor on an interior wall. The sensor cover may include a cover sidewall, a cover faceplate, and a sensor clip arm. The cover sidewall may be in selective engagement with the interior wall. The cover faceplate may extend from the cover sidewall. The cover faceplate may have an outer surface direct outward from the interior wall and an inner surface directed inward toward the interior wall. The sensor clip arm may extend inward from the inner surface. The sensor clip arm may hold the wired electronic sensor within an interior volume defined by the cover sidewall and the cover faceplate.

In another exemplary aspect of the present disclosure, an electronic sensor assembly for a recreational vehicle air conditioner is provided. The electronic sensor assembly may include a wired electronic sensor and a sensor cover supporting the wired electronic sensor on an interior wall. The wired electronic sensor may include a communication wire and a sensor body having a distal tip directed in a predetermined direction. The sensor cover may include a cover sidewall, a cover faceplate, a sensor clip arm, and an interior umbrella. The cover sidewall may be in selective engagement with the interior wall. The cover faceplate may extend from the cover sidewall. The cover faceplate may have an outer surface direct outward from the interior wall and an inner surface directed inward toward the interior wall. The sensor clip arm may extend inward from the inner surface. The sensor clip arm may hold the wired electronic sensor within an interior volume defined by the cover sidewall and the cover faceplate. The interior umbrella may extend inward from the inner surface. At least a portion of the interior umbrella may be disposed above the sensor clip arm.

In yet another exemplary aspect of the present disclosure, a recreational vehicle is provided. The recreational vehicle may include an interior wall defining a passenger compartment, a wired electronic sensor, and a sensor cover. The wired electronic sensor may be disposed within the passenger compartment. The wired electronic sensor may include a communication wire and a sensor body having a distal tip directed downward. The sensor cover may support the wired electronic sensor on the interior wall. The sensor cover may include a cover sidewall, a cover faceplate, a sensor clip arm, and an interior umbrella. The cover sidewall may be in selective engagement with the interior wall. The cover faceplate may extend from the cover sidewall. The cover faceplate may have an outer surface direct outward from the interior wall and an inner surface directed inward toward the interior wall. The sensor clip arm may extend inward from the inner surface. The sensor clip arm may hold the wired electronic sensor within an interior volume defined by the cover sidewall and the cover faceplate. The interior umbrella may extend inward from the inner surface. At least a portion of the interior umbrella may be disposed above the sensor clip arm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
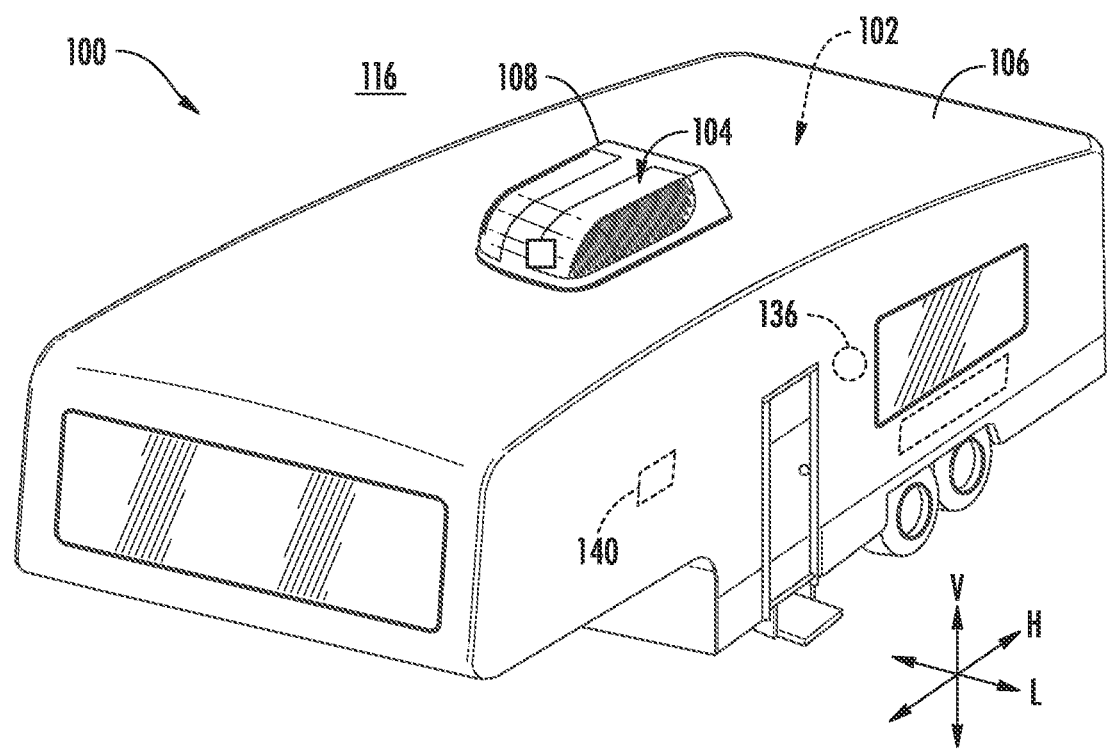
FIG. 1 provides a perspective view of a recreational vehicle according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment is desirable.

Accordingly, an air conditioning system or air conditioner 104 may be mounted on recreational vehicle 100 to provide cooled air to the passenger compartment 102. Air conditioning system 104 is typically mounted to an outside surface 106 of recreational vehicle 100. This arrangement is desirable because a byproduct of operation of air conditioning system 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioning system 104 may be mounted on an outer surface 106, such as the ceiling or top of recreational vehicle 100. Also as shown in FIG. 1, air conditioning system 104 may include a top cover or outer grill 108 that is positioned over the working components air conditioning system 104, e.g., to protect such working components from rain, wind, debris, etc. Although an exemplary recreational vehicle is illustrated, it should be appreciated that air conditioner 104 may be used in or with any suitable recreational vehicle.

Figure 2:
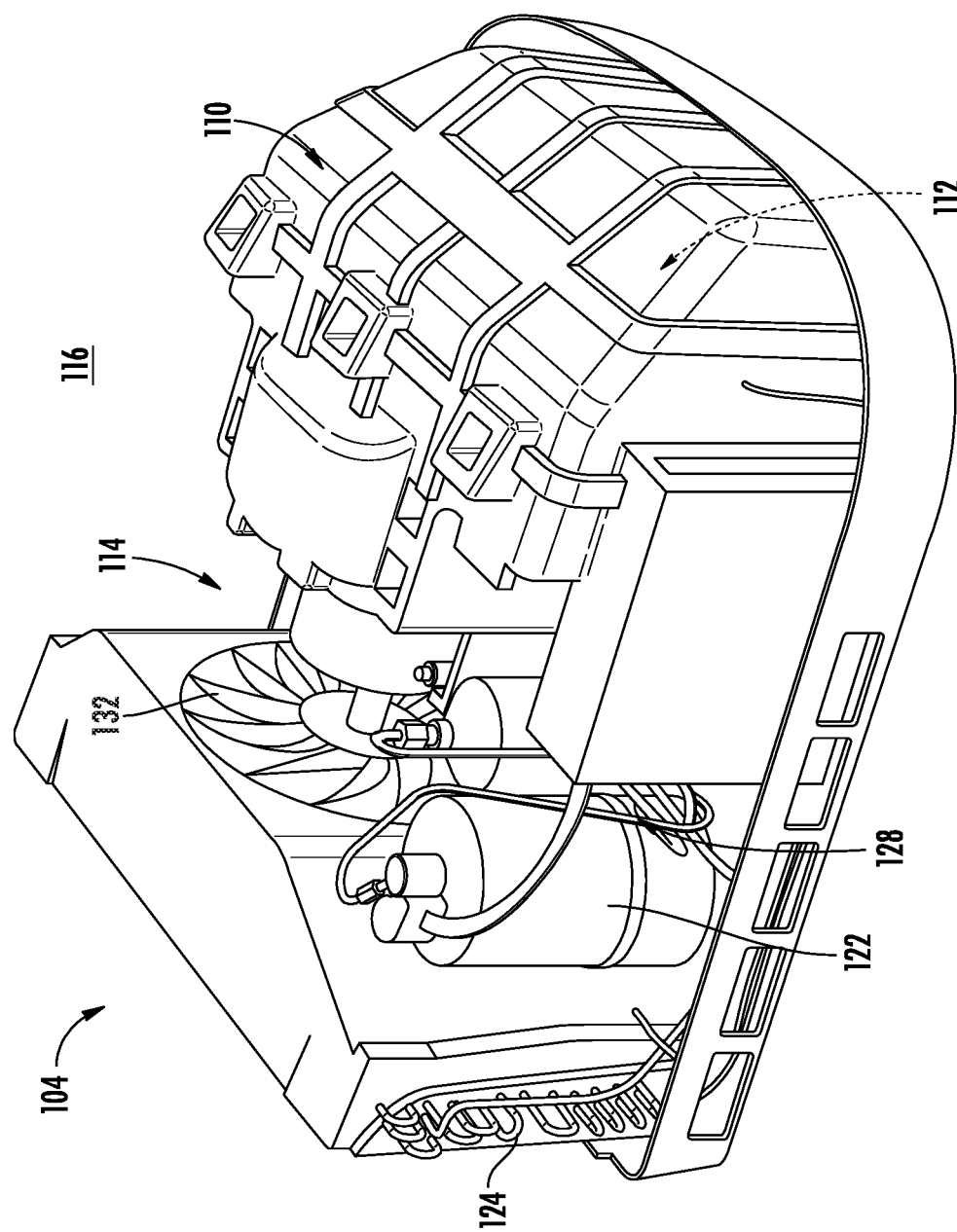
FIG. 2 provides a perspective view of a recreational vehicle air conditioner (RVAC) that may be used with the exemplary recreational vehicle of FIG. 1, with an outdoor cover removed for clarity.
Figure 3:
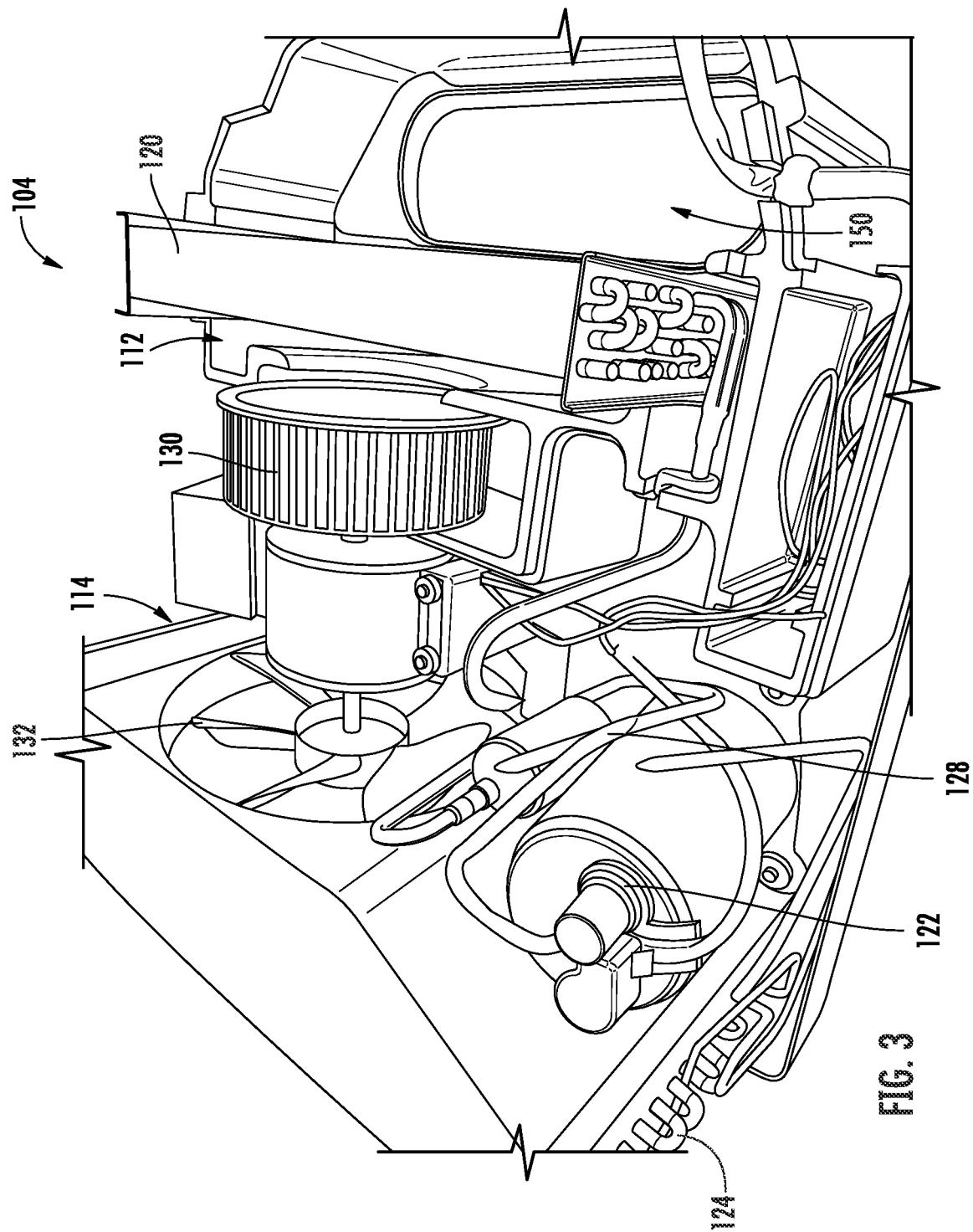
FIG. 3 provides a perspective view of the exemplary RVAC of FIG. 2 with an indoor cover removed for clarity.
Figure 4:
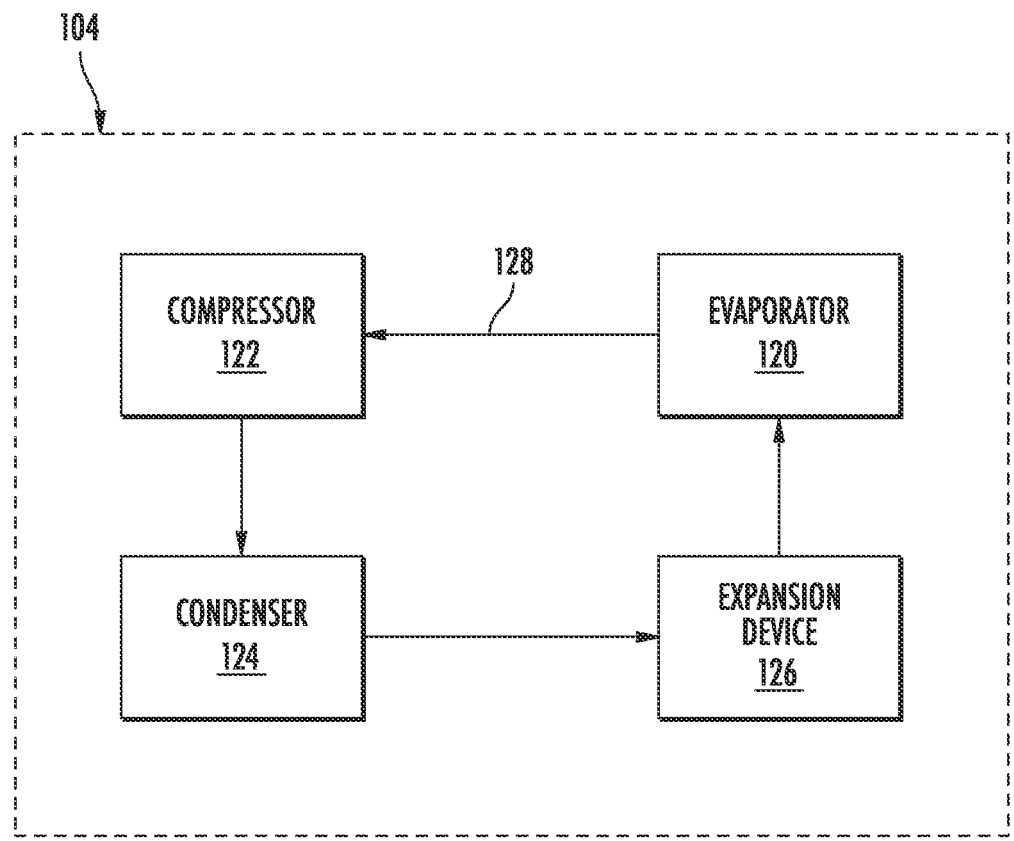
FIG. 4 provides a schematic view of an air conditioning system according to an exemplary embodiment of the present disclosure.
Figure 5:
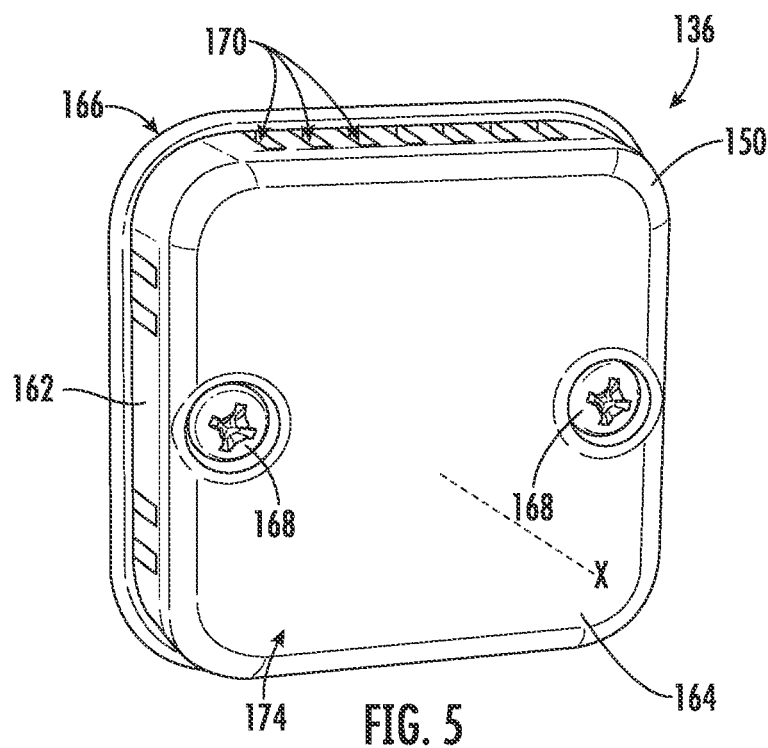
FIG. 5 provides an outer perspective view of a sensor assembly for the exemplary recreational vehicle of FIG. 1 according to an exemplary embodiment of the present disclosure.
Figure 6:
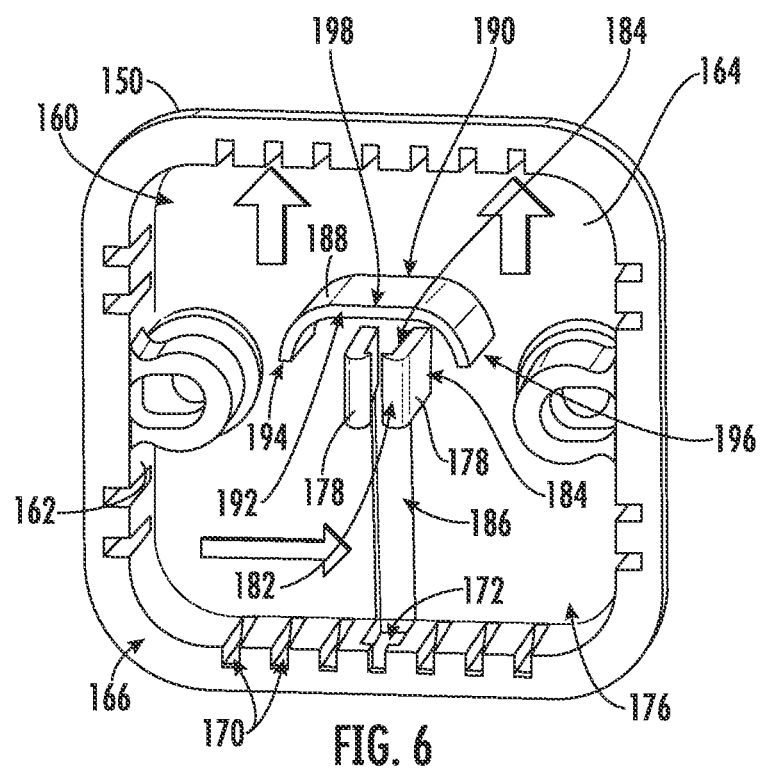
FIG. 6 provides an inner perspective view of the sensor cover of the exemplary sensor assembly of FIG. 5.
Figure 7:
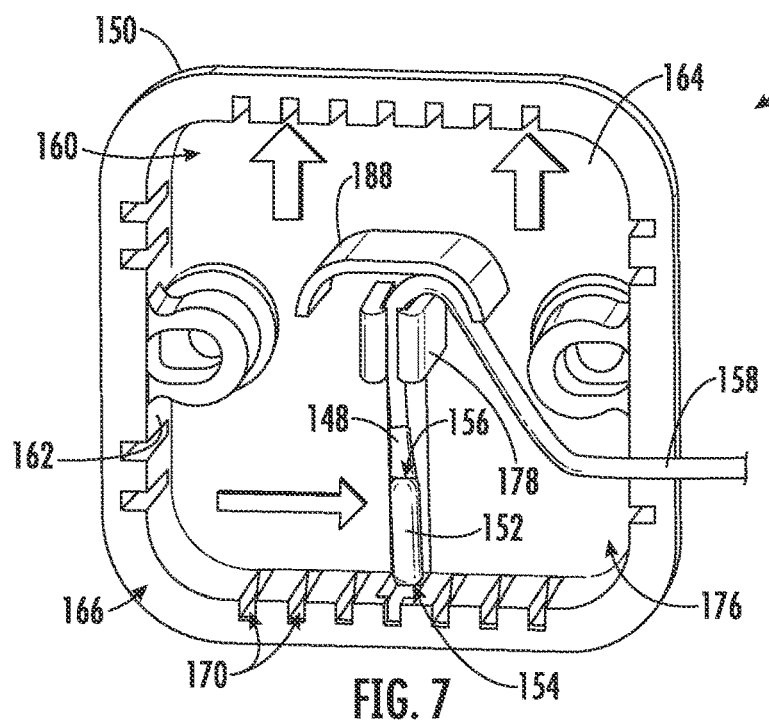
FIG. 7 provides an inner perspective view of the exemplary sensor assembly of FIG. 5.
Figure 8:
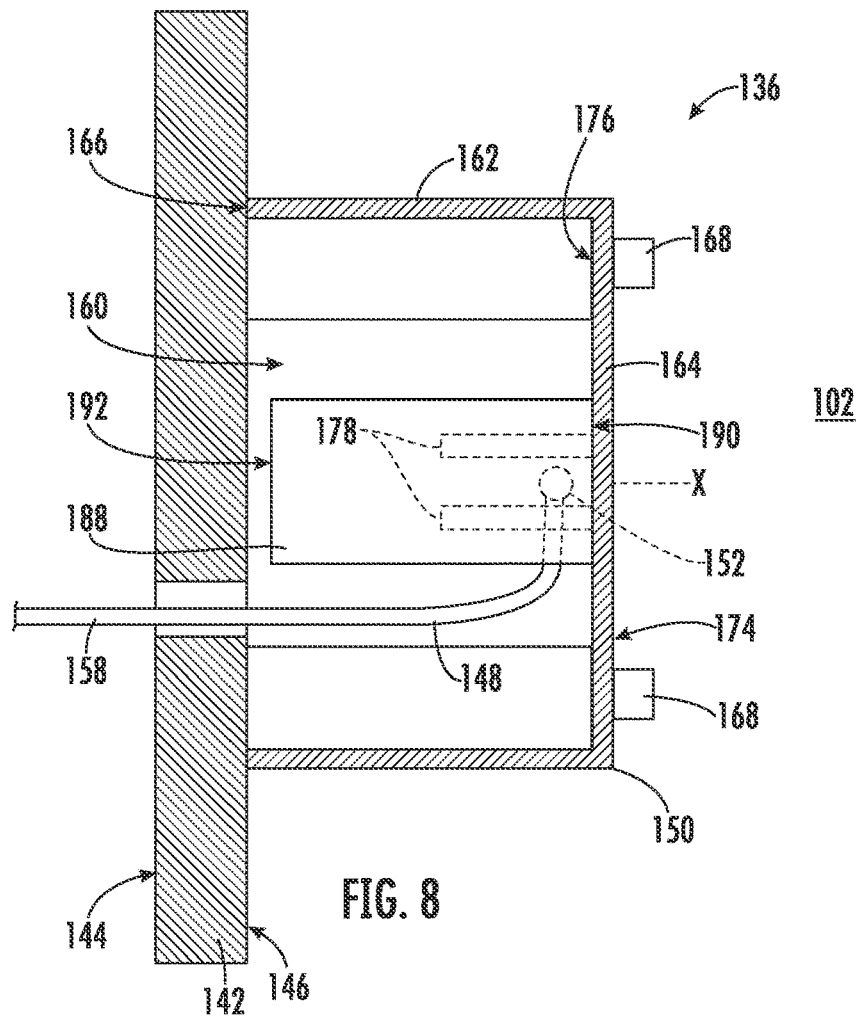
FIG. 8 provides a top section view of the exemplary sensor assembly of FIG. 5.

Referring now generally to FIGS. 2 through 4, the operation of air conditioning system 104 will be described in more detail according to exemplary embodiments of the present subject matter. In this regard, FIG. 2 illustrates a top, perspective view of air conditioner 104 of recreational vehicle 100 with outer grill 108 removed to reveal internal working components of air conditioner 104. As illustrated, air conditioning system 104 generally includes an indoor bulkhead or indoor cover 110 that divides air conditioning system 104 between an indoor and outdoor portion, such as in a packaged terminal air conditioner unit (PTAC) or a split heat pump system. Specifically, indoor cover 110 defines and indoor air plenum 112 and an outdoor air plenum 114. In this regard, indoor cover 110 generally shields the indoor components of air conditioning system 104 from the outdoor environment 116.

Referring now also to FIG. 3, indoor cover 110 is removed to reveal additional working components of air conditioning system 104. In addition, FIG. 4 illustrates a schematic view of air conditioning system 104. Relevant components of air conditioning system 104 will now be described. It should be understood that air conditioning system 104 includes various heat pump components, such as a sealed system, for treating air within an interior of an associated recreational vehicle 100. Such components are well understood by those skilled in the art and a description of such components is omitted for the sake of brevity.

In this regard, for example, air conditioning system 104 includes refrigerant circulating between evaporator 120, compressor 122, condenser 124, and expansion device 126, as shown in the refrigeration loop 128 of air conditioning system 104 in FIGS. 2 through 4. Refrigerant, also known as coolant, carries heat from the passenger compartment 102 of recreational vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner system 104 may include an indoor fan 130 configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well-above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioning system 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

Recreational vehicle 100 may further include a controller 140. Controller 140 may control various operations within recreational vehicle, such as air conditioning unit 104. Controller 140 may be provided at any suitable location within recreational vehicle 100, and may be operably coupled (e.g., electrically or wirelessly coupled) to air conditioning unit 104. Further, controller 140 may be operably coupled to one or more sensor assemblies 136, which will be described in further detail below.

In some embodiments, controller 140 includes one or more memory devices and one or more processors. The processors can be any combination of general or special purpose processors, CPUs, or the like that can execute programming instructions or control code associated with operation of recreational vehicle 100. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 140 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 140 includes a network interface such that controller 140 can connect to and communicate over one or more wireless networks with one or more network nodes. Controller 140 can also include one or more transmitting, receiving, or transceiving components for transmitting/receiving communications with other devices communicatively coupled with recreational vehicle 100. Additionally, or alternatively, one or more transmitting, receiving, or transceiving components can be located off board controller 140.

Recreational vehicle 100 may further include an interior electronic sensor 136 provided in passenger compartment 102. During use, interior electronic sensor 136 may generally sense or measure one or more atmospheric conditions (e.g., temperature, humidity, etc.) within passenger compartment 102. Interior electronic sensor 136 may then transmit the atmospheric condition data to controller 140 (e.g., as one or more interior temperature signals). For instance, in the case of a temperature sensor, such as a thermistor or thermocouple included with interior electronic sensor 136, one or more voltages corresponding to temperature at the sensor 136 may be transmitted along a wired path to controller 140, wherein the received voltages can be used to calculate the corresponding temperature. Accordingly, an interior electronic of passenger compartment 102 may be continually monitored (e.g., during activation or use of air conditioner 104).

Turning now to FIGS. 5 through 8, various views are provided of electronic sensor assembly 136, including portions thereof, according to exemplary embodiments of the present disclosure. As shown, electronic sensor assembly 136 generally includes a wired electronic sensor 148 and sensor cover 150 that defines an axial direction X.

Generally, wired electronic sensor 148 includes suitable sensor to detect an atmospheric condition within passenger compartment 102 (FIG. 1) (e.g., a thermistor, thermocouple, hygrometer, etc.). In certain embodiments, wired electronic sensor 148 has a sensor body 152 with that extends from a distal tip 154 to a connection end 156, which is joined to a communication wire 158. Distal tip 154 may thus be unrestrained while connection end 156 is physically and electrically connected to communication wire 158. Moreover, through communication wire 158 and, optionally, one or more other conductive wires, wired electronic sensor 148 may electrically connect to controller 140 (FIG. 1). When assembled, communication wire 158 may extend through at least a portion of an interior wall 142 of passenger compartment 102. For instance, communication wire 158 may be disposed within a wall hole defined through interior wall 142 from an insulation surface 144 (which may face away from passenger compartment 102 such that it is not visible to a user therein) to an exposed surface 146 (which may face or otherwise be visible to users within passenger compartment 102). Thus, sensor body 152 may generally be held within passenger compartment 102 while communication wire 158 extends rearward to a region behind interior wall 142.

As will be described in greater detail below, sensor cover 150 may support wired electronic sensor 148, such as on interior wall 142. In particular, sensor cover 150 may support wired electronic sensor 148 at exposed surface 146 of interior wall 142 to ensure wired electronic sensor 148 can generally detect conditions within passenger compartment 102.

Sensor cover 150 includes multiple panels or walls that together define an interior volume 160. In some embodiments, this includes a cover faceplate 164 and one or more cover sidewalls 162. As shown, cover faceplate 164 and cover sidewall(s) 162 may define interior volume 160 as an open volume that has a volume opening defined by a peripheral edge 166 by cover sidewall(s) 162. When assembled, cover sidewall(s) 162 may selectively engage (e.g., contact) the interior wall 142. For instance, peripheral edge 166 may be secured against the exposed surface 146 at one axial end of sensor cover 150. At the opposite end of sensor cover 150, cover faceplate 164 may extend from cover sidewalls 162 (e.g., radially). Thus, when assembled, interior volume 160 may generally extend and be contained between cover faceplate 164 and exposed surface 146 of interior wall 142. Optionally, sensor cover 150 may be formed as an integral member (e.g., unitary monolith) from a suitable material (e.g., rigid polymer). In such embodiments, cover faceplate 164 may thus be integrally joined to cover sidewall(s) 162.

Generally, sensor cover 150 may be attached to interior wall 142. In some embodiments, a plurality of mechanical fasteners 168 (e.g., bolts, screws, clips, etc.) extend inward through sensor cover 150 to selectively join sensor to interior wall 142. For instance, a pair of fasteners 168 may be disposed through cover faceplate 164 to hold peripheral edge 166 on the exposed surface 146 of interior wall 142.

In optional embodiments, cover sidewall(s) 162 define a plurality of air slots 170. Generally, air slots 170 may extend fully through one or more cover sidewalls 162 to permit air to the interior volume 160. For instance, each air slot 170 may extend radially through a cover sidewall 162 such that air is permitted to flow into and out of interior volume 160. As shown, the air slots 170 may further be spaced apart from each other (e.g., circumferentially about the axial direction X). Thus, air within interior volume 160 may generally reflect or mirror the conditions of air within the surrounding passenger compartment 102. Nonetheless, in additional or alternative embodiments, cover faceplate 164 may include or be formed as a continuous nonpermeable body (e.g., solid such that no exposed or uncovered holes extend between an outer surface 174 of cover faceplate 164 to an inner surface 176 of cover faceplate 164). The continuous nonpermeable body of cover faceplate 164 may be formed from an opaque material. In turn, a user may be unable to see through to the interior volume 160 when facing or standing in front of cover faceplate 164.

Extending inward from the inner surface 176 of cover faceplate 164, sensor cover 150 may further include one or more sensor clip arms 178. In particular, sensor clip arms 178 may extend axially between a clip support end 180 to a clip free end 182. As shown, clip support end 180 may be defined at the inner surface 176 of cover faceplate 164. Clip free end 182 may be disposed axially inward from cover faceplate 164 (e.g., proximal to exposed surface 146). In some embodiments, clip free end 182 is spaced apart from exposed surface 146. An axial length of sensor clip arm(s) 178 may be defined as shorter than an axial length from peripheral edge 166 to inner surface 176.

Generally, sensor clip arms 178 hold wired electronic sensor 148 within interior volume 160. For instance, sensor clip arm(s) 178 may define a gap 184 within which a portion of wired electronic sensor 148 may be disposed (e.g., in a friction fit). In the illustrated embodiments, the gap 184 is defined (e.g., vertically) between a pair of sensor clip arms 178. As shown, the pair of sensor clip arms 178 are laterally spaced apart and the gap 184 is defined as a vertical sub-passage within interior volume 160. When assembled, the gap 184 may receive wired electronic sensor 148 (e.g., at communication wire 158). Advantageously, wired electronic sensor 148 may be permitted to move with sensor cover 150 (e.g., during installation). Additionally or alternatively, wired electronic sensor 148 may be readily and easily held in a predetermined position relative to sensor cover 150.

With interior volume 160, distal tip 154 of wired electronic sensor 148 may be directed in a predetermined direction (e.g., downward). Additionally or alternatively, sensor body 152 may be disposed below sensor clip arms 178 (e.g., the gap 184 thereof). In additional or alternative embodiments, at least a portion of wired electronic sensor 148 extends over a sensor clip arm 178. For instance, communication wire 158 may be routed such that a portion between the connection end 156 and the interior wall 142 goes over a sensor clip arm 178 while another portion is held in gap 184 (e.g., such that sensor body 152 and distal tip 154 are directed downward below sensor arm clip(s) 178). Optionally, cover sidewall 162 may define a cover opening 172 in vertical alignment with the distal tip 154. For instance, an enlarged or separate slot may extend vertically through sidewall 162 directly beneath distal tip 154, notably ensuring air is directed from the surrounding passenger compartment 102 to the distal tip 154 of wired electronic sensor 148.

In some embodiments, inner surface 176 of cover faceplate 164 further defines a recessed groove 186. In particular, recessed groove 186 may define a channel that is open to interior volume 160 and extends axially outward through a portion of cover faceplate 164 without extending fully to outer surface 174. Additionally or alternatively, recessed groove 186 may be defined below sensor clip arm 178. For instance, recessed groove 186 may extend vertically directly beneath gap 184. When assembled, recessed groove 186 may receive a portion of wired electronic sensor 148. Sensor body 152 may sit in or be aligned with recessed groove 186, further restricting or guiding placement of wired electronic sensor 148 within interior volume 160.

In certain embodiments, sensor cover 150 further includes an interior umbrella 188 disposed above sensor clip arm 178 within interior volume 160. Interior umbrella 188 may extend inward from the inner surface 176. In particular, sensor clip arms 178 may extend axially between an umbrella support end 190 to an umbrella free end 192. As shown, clip support end 180 may be defined at the inner surface 176 of cover faceplate 164 directly above sensor clip arm(s) 178 (e.g., and gap 184). Clip free end 182 may be disposed axially inward from cover faceplate 164 (e.g., proximal to exposed surface 146). In some embodiments, clip free end 182 is spaced apart from exposed surface 146. An axial length of sensor clip arm(s) 178 may be defined as shorter than an axial length from peripheral edge 166 to inner surface 176.

In exemplary embodiments, interior umbrella 188 is curved along the inner surface 176 (e.g., at umbrella support end 190). Thus, an arcuate path or shape may be formed for interior umbrella 188 (e.g., about axial direction X). Optionally, umbrella free end 192 may be parallel to umbrella support end 190. Generally, the arcuate path of interior umbrella 188 may define an apex 198 above and between a pair of side edges 194, 196. In some such embodiments, interior umbrella 188 extends laterally (e.g., perpendicular to axial direction X) between a first side edge 194 and a second side edge 196. The apex 198 of the interior umbrella 188 may defined disposed above the sensor clip arm 178 between and above the first side edge 194 and the second side edge 196. Additionally or alternatively, the side edges 194, 196 may be disposed lower than an upper surface of clip arm(s) 178. Advantageously, and moisture falling into interior volume 160 (e.g., through an air slot 170) may be directed around interior umbrella 188 and be prevented from striking sensor body 152.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electronic sensor assembly for an interior wall, the electronic sensor assembly comprising:
   a wired electronic sensor; and
   a sensor cover supporting the wired electronic sensor on the interior wall, the sensor cover defining an axial direction and comprising:
      a cover sidewall in selective contact with the interior wall at one axial end of the sensor cover,
      a cover faceplate extending from the cover sidewall perpendicular to the axial direction at an opposite end of the sensor cover, the cover faceplate having an outer surface directed outward from the interior wall and an inner surface directed inward toward the interior wall, and a sensor clip arm extending inward from the inner surface, the sensor clip arm holding the wired electronic sensor within an interior volume defined by the cover sidewall and the cover faceplate.

2. The electronic sensor assembly of claim 1, wherein the cover sidewall defines a plurality of air slots perpendicular to the axial direction to permit air to the interior volume, and wherein the cover faceplate comprises a continuous nonpermeable body from the outer surface to the inner surface.

3. The electronic sensor assembly of claim 1, wherein the wired electronic sensor comprises a distal tip directed downward, the distal tip being disposed below the sensor clip arm within the interior volume.

4. The electronic sensor assembly of claim 3, wherein the sensor clip arm comprises a pair of sensor clip arms, the pair of sensor clip arms being laterally spaced apart to define a gap therebetween, wherein the wired electronic sensor extends over one sensor clip arm of the pair of sensor clip arms and within the gap.

5. The electronic sensor assembly of claim 1, wherein the inner surface of the cover faceplate defines a recessed groove below the sensor clip arm.

6. The electronic sensor assembly of claim 1, wherein the cover sidewall defines a cover opening in vertical alignment with and directly below a distal tip of the wired electronic sensor.

7. The electronic sensor assembly of claim 1, wherein the sensor cover further comprises an interior umbrella extending inward from the inner surface, at least a portion of the interior umbrella being disposed above the sensor clip arm.

8. The electronic sensor assembly of claim 7, wherein the interior umbrella is curved along the inner surface.

9. The electronic sensor assembly of claim 8, wherein the interior umbrella extends laterally between a first side edge and a second side edge, an apex of the interior umbrella being defined between the first side edge and the second side edge, the apex being disposed above the sensor clip arm, the first side edge or the second side edge being disposed below an upper surface of the sensor clip arm.

10. The electronic sensor assembly of claim 1, further comprising a plurality of fasteners extends inward through the sensor cover to selectively join the sensor cover to the interior wall.

11. An electronic sensor assembly for an interior wall, the electronic sensor assembly comprising:
    a wired electronic sensor comprising a communication wire and a sensor body having a distal tip directed in a predetermined direction; and
    a sensor cover supporting the wired electronic sensor on the interior wall, the sensor cover defining an axial direction and comprising:
        a cover sidewall in selective contact with the interior wall at one axial end of the sensor cover,
        a cover faceplate extending from the cover sidewall perpendicular to the axial direction at an opposite end of the sensor cover, the cover faceplate having an outer surface directed outward from the interior wall and an inner surface directed inward toward the interior wall, and
        a sensor clip arm extending inward from the inner surface, the sensor clip arm holding the wired electronic sensor within an interior volume defined by the cover sidewall and the cover faceplate, and
        an interior umbrella extending inward from the inner surface, at least a portion of the interior umbrella being disposed above the sensor clip arm.

12. The electronic sensor assembly of claim 11, wherein the cover sidewall defines a plurality of air slots to permit air to the interior volume, and wherein the cover faceplate comprises a continuous nonpermeable body from the outer surface to the inner surface.

13. The electronic sensor assembly of claim 12, wherein the sensor clip arm comprises a pair of sensor clip arms, the pair of sensor clip arms being laterally spaced apart to define a gap therebetween, wherein the wired electronic sensor extends over one sensor clip arm of the pair of sensor clip arms and within the gap.

14. The electronic sensor assembly of claim 11, wherein the inner surface of the cover faceplate defines a recessed groove below the sensor clip arm.

15. The electronic sensor assembly of claim 11, wherein the cover sidewall defines a cover opening in vertical alignment with and directly below the distal tip of the wired electronic sensor.

16. The electronic sensor assembly of claim 11, wherein the interior umbrella is curved along the inner surface.

17. The electronic sensor assembly of claim 16, wherein the interior umbrella extends laterally between a first side edge and a second side edge, an apex of the interior umbrella being defined between the first side edge and the second side edge, the apex being disposed above the sensor clip arm, the first side edge or the second side edge being disposed below an upper surface of the sensor clip arm.

18. The electronic sensor assembly of claim 11, further comprising a plurality of fasteners extends inward through the sensor cover to selectively join the interior sensor cover to the wall.

19. A recreational vehicle comprising:
    an interior wall defining a passenger compartment;
    a wired electronic sensor disposed within the passenger compartment, the wired electronic sensor comprising a communication wire and a sensor body having a distal tip directed downward; and
    a sensor cover supporting the wired electronic sensor on the interior wall, the sensor cover defining an axial direction and comprising:
        a cover sidewall in selective contact with the interior wall at one axial end of the sensor cover,
        a cover faceplate extending from the cover sidewall perpendicular to the axial direction at an opposite end of the sensor cover, the cover faceplate having an outer surface directed outward from the interior wall and an inner surface directed inward toward the interior wall, and
        a sensor clip arm extending inward from the inner surface above the distal tip, the sensor clip arm holding the wired electronic sensor within an interior volume defined by the cover sidewall and the cover faceplate, and
        an interior umbrella extending inward from the inner surface, at least a portion of the interior umbrella being disposed above the sensor clip arm.

20. The electronic sensor assembly of claim 19, wherein the sensor clip arm comprises a pair of sensor clip arms, the pair of sensor clip arms being laterally spaced apart to define a gap therebetween, wherein the wired electronic sensor extends over one sensor clip arm of the pair of sensor clip arms and within the gap.

* * * * *